United States Patent [19]

Homan

[11] Patent Number: 4,923,116
[45] Date of Patent: May 8, 1990

[54] BATH WATER CONTROL SYSTEM

[76] Inventor: Gerald L. Homan, 103 Dexter Cir., Madison, Ala. 35758

[21] Appl. No.: 357,063

[22] Filed: May 24, 1989

[51] Int. Cl.⁵ .......................................... G05D 23/185
[52] U.S. Cl. ..................................... 236/12.12; 4/192; 364/502
[58] Field of Search .......................... 236/12.12, 46 R; 364/502, 557; 4/192

[56] References Cited

U.S. PATENT DOCUMENTS

| 4,308,991 | 1/1982 | Peinetti et al. | 236/46 R |
| 4,420,811 | 12/1983 | Tarnay et al. | 364/502 X |
| 4,700,884 | 10/1987 | Barrett et al. | 236/12.12 |

Primary Examiner—William E. Wayner
Attorney, Agent, or Firm—C. A. Phillips

[57] ABSTRACT

A bath water control system in which the bath water is selectively supplied a bath or shower outlets, and the water supply is as to both temperature and period of supply. These parameters may be prestored in a memory along with discrete start times whereby a programmed bath will be automatically available at a discrete time or times in the future. As a means of ensuring that water is not accumulated in the tub prior to water temperature rising to a selected value, the tub drain is closed only after input bath water reaches a selected temperature. Further, means are provided for turning off water in the event that water in excess of a selected value appears. Still further, the temperature of water is indicated both digitally and aurally.

22 Claims, 4 Drawing Sheets

BATH WATER CONTROL SYSTEM

FIELD OF THE INVENTION

This invention relates generally to an automatic temperature control system and more particularly to one which can be user programmed for operation of a shower or bath.

BACKGROUND OF THE INVENTION

Most temperature controls designed for home baths are operated manually, that is, the user must adjust the hot and cold water proportions by feel until an ideal temperature is reached. Because it is difficult to make precise adjustments with manual units, and because the body is sensitive to small differences in temperature, considerble time and water may be wasted in acquiring the most comfortable water temperature. In addition, as the supply water temperature is affected by the heat sink effect of plumbing pipes and fixtures through which it runs, and generally the user must make adjustments to compensate for this effect. Finally, as the hot water supply approaches depletion, the supply temperature begins dropping off so quickly that many times a constant, comfortable temperature of water is impossible to sustain by manual adjustment.

There is a need, therefore, for a convenient mixing device that quickly and efficiently performs precise adjustments to achieve and maintain a constant temperature output and on a preprogrammed basis.

SUMMARY OF THE INVENTION

In accordance with this invention, hot and cold water are controllably mixed in response to a selected temperature. As one feature of this invention, mixing is performed by a mixing valve having a hollow piston which moves back and forth within a housing through which hot and cold water is introduced. The piston and housing each include ports for accommodating hot water in, cold water in, and mixed water out. The piston input ports are offset from their housing counterparts, and a piston is precisely moved by a reversible electromagnetic force, such as by a reversible motor, to allow any desired proportion of hot and cold water to enter the hollow piston. Mixed water then exits from the housing to tub or shower outlets. A motor control signal for controlling the motor is derived from a comparator which compares a signal representative of mixed water temperature with a selected temperature signal, thereby providing more or less hot water to effect the selected temperature.

As a further feature of the invention, a selected temperature signal is stored in a memory together with a selected tub/shower selection signal and duration signal as a set. As a further feature, these are programmed to commence execution at a selected future time or times. Execution of a program is effected by a conventional electronic control means such as by a microprocessor which, responsive to water temperature, controls the mixing valve responsive to tub/selector controls selection, and responsive to the duration signal controls on/off water flow.

As still another feature of the invention, measured water temperature is compared with a selected permissible high temperature as a scald protection feature and when a water temperature is detected above the selected temperature, water flow is shut off.

As still another feature of the invention, control means are provided which enables a user to increment or decrement the value of a preselected water temperature while the water is being drawn.

As still another feature of the invention, a digitally addressable switch is employed which must be addressed with a selected digital input before water delivery can be effected.

As still another feature of the invention, the rate of decrease of water temperature is monitored, and if the rate is above a preselected one, an indicator indicates that the hot water supply is being diminished.

As still another feature of the invention, a water temperature signal is converted to an audio signal which is announced by a speaker.

Finally, as a feature of the invention, a display, of selected time or temperature of water, is provided.

DESCRIPTION OF THE PREFERRED EMBODIMENT

Figure 1:
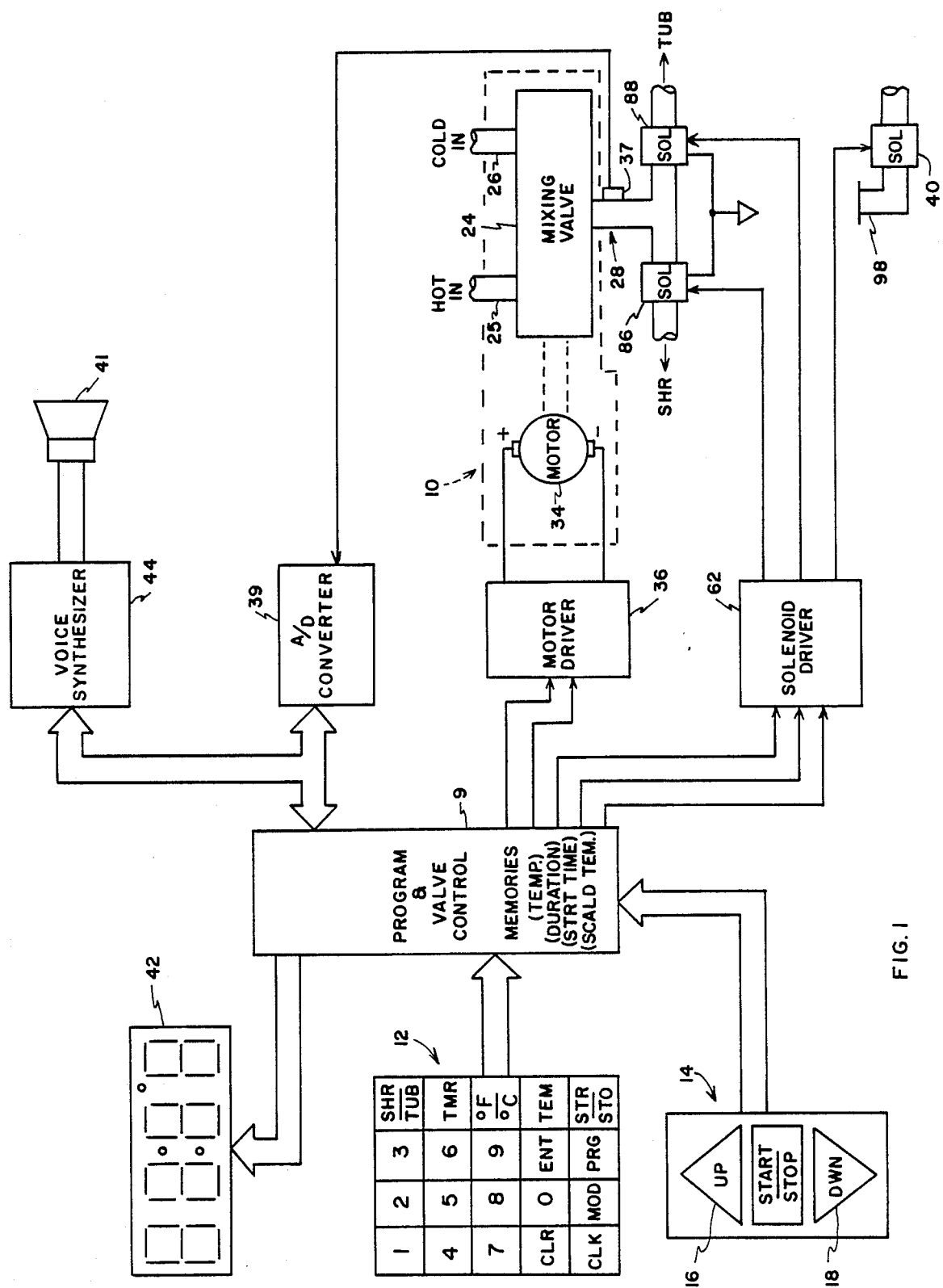
FIG. 1 is a schematic illustration of an embodiment of the invention.

FIG. 1 illustrates an example of the basic organization and configuration of the invention. Program and valve control 9, a conventional microprocessor, includes a number of programmable memories as shown which are loaded from key pad 12 and are illustrative of the basic events to be programmed and controlled. Program and valve control 9 is, in addition, controlled by an abbreviated, hand-held control 14 which, for example, may be readily operated while taking a bath, whereas key pad 12 typically would be mounted on a wall. Display 42 selectively displays time (from clock 11 of program and valve control 9), temperature, and temporarily, program selections pending their entry or execution, as the case may be. Key pad 12 includes the standard numeral designation buttons as well as certain special buttons as labelled. Hand-held control 14 has an additional set of buttons, up and down, whose function will be further described.

Water temperature is regulated by mixer valve assembly 10. It includes a slider type mixer valve 24 which is fed by hot and cold inlets 25 and 26, respectively. An outlet or outlets is connected to the inputs of shower/tub solenoid valves 86 and 88, whereby a mixture of hot and cold water is supplied to either. The actual mixture is controlled by the axial positioning of a valve piston driven by D.C. motor 34, in turn powered by a motor driver 36 and controlled by program and valve control 9.

The start/stop water flow is effected by shower solenoid valve 86 and tub solenoid valve 88. Each is selectively powered from solenoid driver 62 pursuant to control signals from program and valve control 9.

Tub drain 98 is controlled by a solenoid valve 40 which is selectively powered by solenoid driver 62, in turn controlled from program and control 9. This particularly enables tub inlet water to be passed through the drain until water temperature comes up to a preselected temperature, as will be explained.

The control of water temperature requires that the temperature of mixed water be measured, and this is effected by a conventional analog temperature sensor circuit 37 (FIGS. 1 and 2b), for example, employing a thermistor. The output of sensor circuit 37 is converted to an eight-bit digital signal by A/D converter 39 and supplied to program and valve control 9. The latter then effects a comparison between the selected and actual temperature values and controls motor driver 36 to cause motor 34 to operate mixer valve 24 to effect an appropriate adjustment in ratio between hot and cold water emitted. A voice synthesizer 44 (FIGS. 1 and 2b) is provided which, responsive to a temperature output of A/D converter 39 converts the temperature signal to an aural signal, which is then reproduced by a speaker 41 to provide a voice presentation of temperature.

Figure 2A:
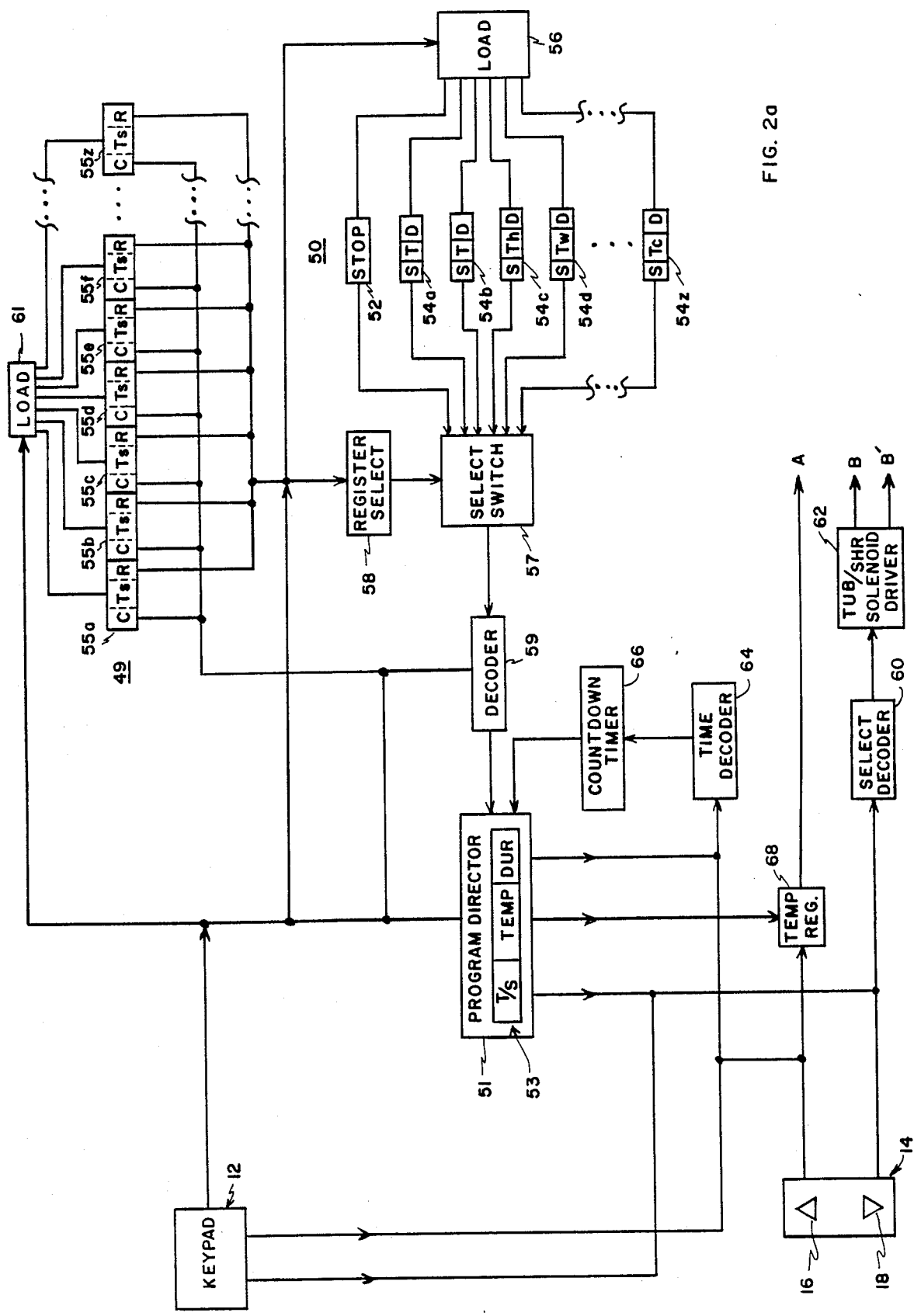
FIGS. 2a and 2b comprise a more detailed schematic illustration of the invention.
Figure 2B:
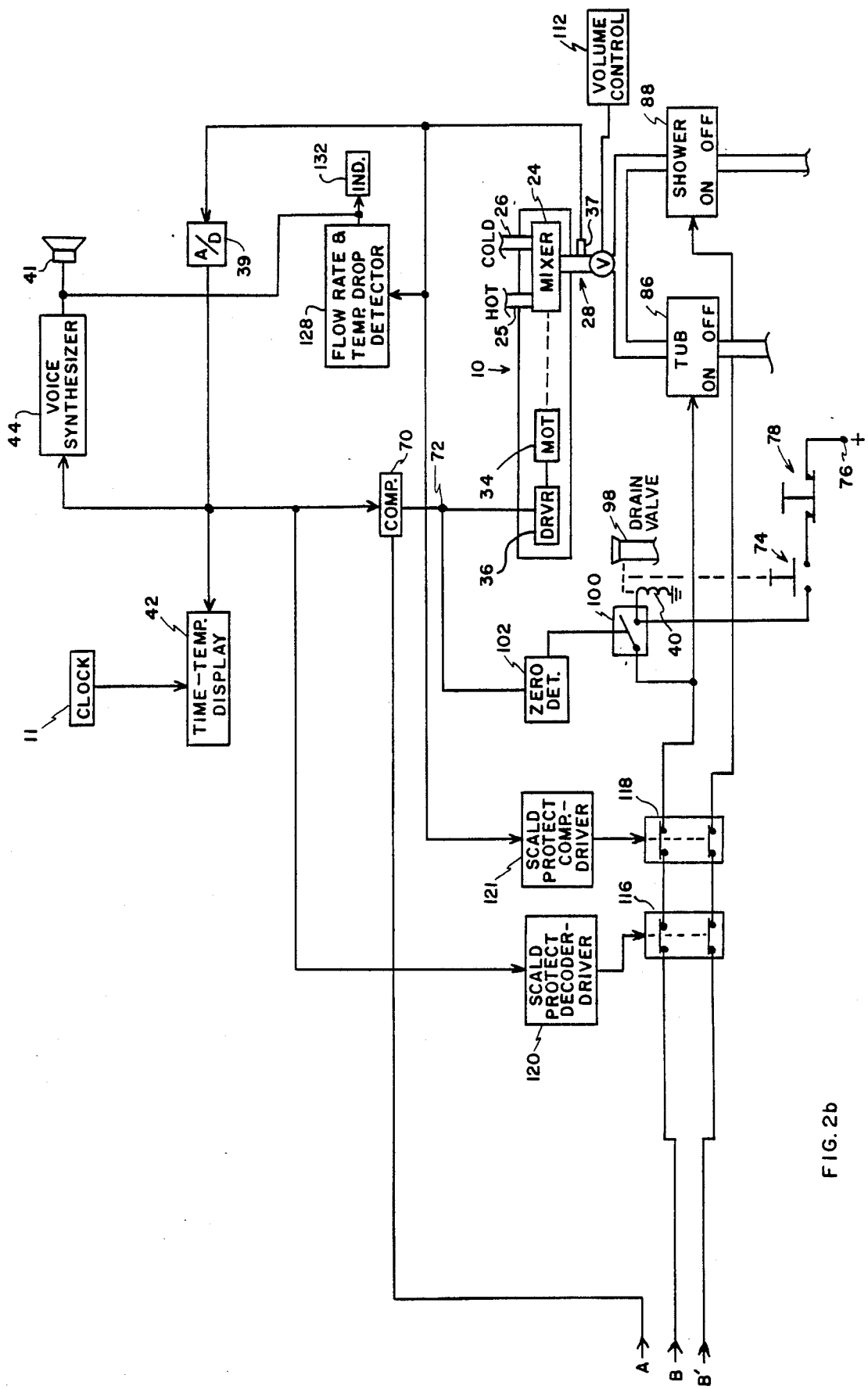

FIGS. 2a and 2b together illustrate in somewhat greater detail the organization and operation of the system envisioned by this invention and particularly certain functions performed in program and valve control 9 (FIG. 1). The system is generally divided into storable registers 50 (FIG. 2a), preset program selector 49, discrete program director 51, and discrete valve controls and controlled valves.

Storable program group 50 is illustrative of the memory arrangement of program and valve control 9 (FIG. 1) wherein there is provided a plurality of registers, and specifically a stop signal register 52 and a group of registers 54a–54z, or a lesser number of registers, wherein each would include register space for storing one or more program words and wherein each word would include (1) a portion representative of tub/shower select, (2) a portion representative of temperature of bath water, and (3) a portion representative of duration of a bath. These are represented by the letters S, T, and D, respectively. In the case of three of them, 54x–54z, there is added an "h" for hot, "w" for warm, and "c" for cold opposite the temperature letter T. Thus, if one of these registers is employed, no specific temperature would be programmed.

Where a single sequence bath is involved, only a single word would be programmed into one of the registers, but where a sequence or stages of a bath are desired, then a word would be programmed in that register for each stage, which would then be executed in the sequence in which it was selected or stored. Thus, if it were desired to have as a first sequence a combination of shower, selected temperature, and selected duration followed by a different combination, for example, where a tub stage were employed and/or different temperatures or durations were desired, then an additional word or words would be programmed. Loading of the register would be effected by register load 56 from key pad 12 by operating the enter button in a conventional manner.

The system also provides for programming the start time, or reoccurring start times, for a bath programmed as above. This is effected by the timed selection for execution of the contents of the selected register of register 55a–55z, each being separately programmed by a particular user. To accomplish this, program selector 49 employs registers 55a–55z, each of which stores three discrete bits of data, one, the register R of one of registers 54a–54z wherein that user has previously stored a description of a desired bath as described. Second, under the label Ts, there is stored the time of start of a reoccurring times, such as a certain time each day. This time then controls an included time countdown which enables readout of that register at zero time. Third, each of these registers has a place for the storage of a common but confidential unlocking code, designated C, as a security means for enabling only a permitted user to load one of registers a–z, loading being effected by a conventional load control 61 from key pad 12.

Upon a countdown of time to the prescribed start time of one of registers 55a–55z, for example, e, its register designation is then fed to register selector switch 58, for example, register 54b of storage register 50 might be the one the instant user has previously programmed and would be selected. Selection is effected by supplying a readout to select switch 57. Select switch 57 typically would comprise a group of triggerable gates, whereby, upon activation by selector switch 58, the contents of register 54b would be selectively gated to the output of select switch 57 and then to decoder 59.

Decoder 59 is, at the same time as the preceding event, fed the contents of the C portion of the same register, register 55e. Decoder 59 includes a decoder and gate circuit, the decoder enabling the gate circuit when the correct code is received. When this occurs, the contents of register 54b is passed through to program director 51. As illustrated by T/S, Temp., and Dur. register 53, the data comprises bath duration instruction, a tub/shower instruction, and a temperature instruction as originally stored in registers 54a–54z under D, S, and T. Since the T/S and Temp. instructions are effective for the period of the duration instruction, the first one to be considered is duration. Thus, as shown, the time duration instruction is fed to decoder 64 which sets a countdown timer 66 to commence counting down, at the end of which the other instructions are cancelled and a new instruction word be loaded into register 53.

Assuming that a countdown is in progress for a particular program as just described for the tub/shower select and temperature, instructions for the same would be read out from register 53 for execution. First, with respect to the tub/shower select, the instruction would be decoded by decoder 60 which would include a solenoid driver 62 and place a drive signal output on lead B or B', B for tub and B' for shower. Each of these leads passes through contacts of digital scald protect relay 116 and analog scald protect 118 as shown in FIG. 2b. Lead B, when powered, operates tub solenoid 86, and lead B', when powered, operates shower solenoid 88.

Second, with respect to temperature, at a selected temperature, its instruction is read out to temperature register 68 (FIG. 2a). The temperature in register 68 may be incremented up or decremented down by an up/down button 16 or 18 of control 14. The contents of temperature register 68, as a command temperature signal, is fed to digital comparator 70 (FIG. 2b) together with an output of A/D converter 39 which provides a digital measure of water temperature as described above. The output 72 of comparator 70 being, for example, positive, indicating a low water temperature state; negative, indicating a high water temperature state; or zero, indicating a desired temperature state. This output is fed to motor driver 36 which converts the signal output to a related D.C. supply voltage to the input of motor 35 to operate mixing valve 24 in a direction to correct any error in temperature. The output of comparator 70 is also fed to zero detector 102 for control of drain valve 98, as will be further explained.

Figure 3:
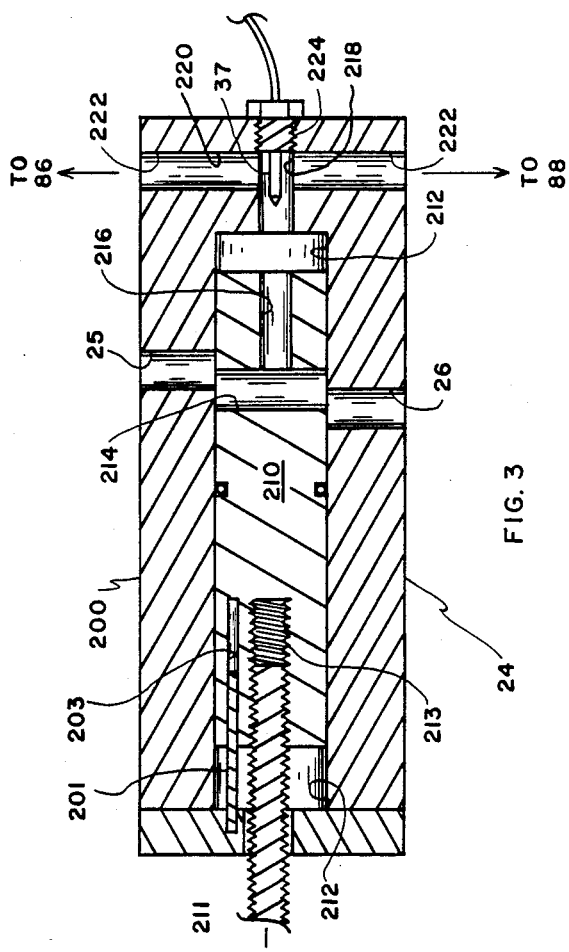
FIG. 3 illustrates a sectional view of a mixing valve assembly shown in FIGS. 1 and 2 together with certain interface drive circuitry.
Figure 3:
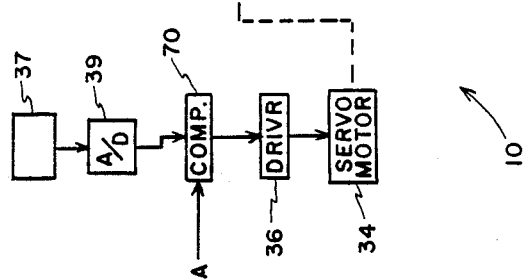

FIG. 3 illustrates in some detail mixer 24. In it, there is an outer valve body or housing 200 having a hot water inlet 25 and cold water inlet 26. A central cylindrical piston 210 is adapted to axially move in a central cavity 212, being held from rotating by guide pin 201 in guide opening 203. Piston 210 has an opening 214 extending from one side to the other and is adapted to differentially couple hot water inlet 25 and cold water inlet 26 to an axially positioned exit opening 216. Opening 216 is coupled via cavity 212 to an opening 218 in housing 24, with opening 218 communicating with a passageway 220 disposed as shown in FIG. 3. Passageway 220 terminates at opposite sides with outlet openings 222. Motor 34, controlled as described above, rotates screw shaft 211 in threaded opening 213 in piston 210 to axially move it in a direction to vary the ratio of hot and cold water admitted. Thus, mixed temperature water from these openings 222 is then supplied to tub on/off solenoid 86 and shower solenoid valve 88 and then through one of these valves which has been selected open for operation (FIG. 2b). Temperature sensor 37 is inserted into an opening 224 whereby the mixed output of water temperature is measured and employed as previously described.

As shown in FIG. 2b, drain solenoid valve 40 is a normally open valve and is operated closed to close drain 98 under two conditions being present, the tub solenoid being energized to emit water and the temperature of mixed inlet water having risen to the selected temperature. The latter condition closes the normally open enabling contacts 100 via zero detector 102, and the former condition, the energized tub signal B, is thereby permitted to energize solenoid 40 and close drain 98. Actually, zero detector 102 provides a discrete output, for example, 12 volts, when the output of comparator 70 is zero or positive, indicating that the mixed water temperature is equal to or greater than a selected temperature. A latching circuit comprised of components 74 and 76, and an energizing source of power 78 is employed to hold the drain closed after the two conditions are removed, such as would be the situation when the tub finished filling and the tub user were taking a bath. To accomplish this, tub solenoid 40, when energized initially by the closing of contacts 100 and the presence of an energizing signal B, is employed to close normally open contacts 74, which in turn connects energizing source 76 to solenoid 90. To open the drain, normally closed contacts 78 are temporarily opened to break the energizing source 76 from solenoid 40 and thereby open normally open contacts 74 to deenergize the latching circuit and open drain valve 98.

Scald protection is redundantly provided via relays 116 and 118, each having two sets of normally closed contacts, one being in series with tub select B and the other in series with shower select B'. Relay 116 is driven by digital decoder-driver 120 which, responsive to a selected "excessive water temperature signal" from A/D converter 39, provides a relay operating voltage to close either one of solenoids valves delivering either tub or shower water. Relay 118 is directly driven by analog comparator-driver 121 responsive to an "excessive temperature" signal from temperature sensor 37 and operates in the same fashion to shut off a like solenoid valve.

The actual rate of flow or volume (CFM) into either tub or shower is controlled conventionally as with existing manually operated type valves or, for example, by an electrically operated valve and valve control 112 (FIG. 2b) wherein the valve opening is controllable in more than one size or degree of valve opening.

The system also provides for an indication of an approaching depletion of hot water. This is accomplished by temperature drop detector 128 (FIG. 2b) which is connected to temperature sensor circuit 37. Detector 128 comprises an analog differentiator which detects a decline in rate, temperature drop versus time, for example, on the order of 20 seconds, and provides an output to indicator 132 that greater than a selected differential signal has occurred. Indicator 132, for example, may include a tone generator and reproducer. Alternately, where only a tone generator, its output may be applied to speaker 41 as an indicator.

A typical operation of the system may be summarized as follows. To begin operation, the user must, via key pad 12 or hand control 14 (FIG. 2a), load at least one of the instruction registers 54a–54z with one or more instruction words. Typically, several instruction registers would be programmed to provide various options for the user. These programs may be loaded and then prestored in the instruction registers, or, they may be loaded just before or during tub or shower usage.

Typical programs would be as follows. For a time temperature "profile" program, the user would load two or more instruction words into one of instruction registers 54a–54z to program the mixer output water temperature to adjust automatically to each instructed temperature T and maintain that temperature for the instructed duration period D. If it is desired for the system to stop automatically after the last instruction word time period expires, the user would insert a stop command instruction at the end of the instruction word sequence or select via program select switch 57 the stop register 52 at the appropriate point in time. Otherwise the instruction register will continuously cycle the instruction words in sequence until the user sets select switch 57 to select stop command 52.

If the user desires only a single temperature operation, as would be the case in a more conventional use of the tub or shower, then an instruction register of registers 54a–54z would be programmed with only a single instruction word. If the user desires to automatically stop the operation after the instructed period of time, as described before, a stop instruction would be placed after the single instruction word, and the tub or shower operation would cease when the instructed time expired. Again, if continuous operation is desired, the stop instruction would be left out, and the operation of the tub or shower with the selected temperature would continuously repeat until the user sets select switch 57 to stop command 52.

Once the instructions words are loaded or programmed into the instructions registers 54a–54z, operation of the system may be initiated in either of two ways. First, the user may program the system to automatically start by presetting any one of registers 55a–55z of program selector 52 and thereby the time selection of a readout of registers 55a–55z. Each of registers 55a–55z represents a single option for automatic startup, and therefore there will be as many options as there are registers.

· If the user desires for an automatic operation of an option to repeat, as would be the situation where the user desired to begin the bath water running at the same time every evening, then that particular option could be programmed to repeat. This also would include the capability to program sequences of repeat functions, as would be the case if the user desired to repeat an option for only a certain number of days in the week, i.e., Monday through Friday, or Tuesday and Thursday of every week. In this situation, the user would program one of registers 55a–55z as before, except that the sequences would be programmed to repeat in intervals as the user desires. Once the user programs a system to start automatically, when the timed portion Ts of the programmed one of registers 55a–55z arrives, the R portion of the instruction would be employed through selector switch 58 to read out the indicated instruction register of registers 54a–54z through select switch 57 to program director 51 as discussed above. This would assume, of course, that the correct code has been supplied decode switch 59 via the C portion of instruction registers 55a–55z. This feature prevents unauthorized users, such as small children, from tampering with the system and starting it by accident. Where desired, there would also be included a digitally addressable "unlock" feature for setting the clocks 55a–55z such that unauthorized users would also be prevented from tampering with the programmed settings for automatic starts.

Once the system has read the first instruction word into register 51 (FIG. 2a), the system operates as follows. T/S in register 53 is read out and decoded by decoder 60, which then instructs tub/shower select circuit 62 to energize lead B or B' to open solenoid 86 or 88 (FIG. 2b). If the tub is selected, tub drain solenoid 40 will close the tub drain 98 when zero detector 102 detects that the proper mixer water output temperature has been reached according to comparator output 72. As discussed above, with either solenoid valve 86 or 88 open, hot water and cold water flow into mixer 24. The temperature instruction Temp. of register 53 (FIG. 2a) is read to temperature register 68 and thereby supplied as a digital signal to comparator 70 (FIG. 2b) and thereby compared with the existing digital temperature signal from A/D converter 39. The difference of these two temperatures is an output of a polarity and/or value which motor driver 36 converts to a particular polarity drive signal which, when supplied to motor 34, will drive piston 210 in a direction to produce a selected temperature output 28 of mixer valve 24.

If the user desires to increase or decrease the temperature of the tub or shower water, an up button 16 or down button 18 would be toggled on hand-held control 14 to increment or decrement the selected temperature in register 68. Of course, if a "profile" instruction sequence is being read from one of instruction registers 54a–54z, the next instruction word will send a new instruction temperature to temperature register 53 which will be unaffected by any prior hot/cold adjustments.

As generally discussed above, at the same time that the selected temperature instruction Temp. is loaded into register 68 and the select instruction T/S entered, one of solenoid valves 86 or 88 is operated open, and time instruction Time would instruct timer 66 to begin counting down for the instructed time period. The time instruction in 66 determines the length of time that the temperature instruction in 53 and select instruction in 62 are operative. Alternately, a countdown timer may be employed that does not begin counting down until the proper temperature has been achieved at the mixer output 28. This would save the user from having to consider in his "profile" program the amount of time required for mixer 24 to readjust to each new temperature.

Once the countdown time has elapsed, register 53 is cleared and the next instruction word command is requested by an enable command to the selected register of registers 54a–54z. The next instruction word will be read into register 53, and the operation of the system as described will be repeated until the last instruction word in the program is reached. If there is a stop instruction after the last instruction word, solenoid valve 86 or 88 (FIGS. 1 and 2b) will close, and all but nominal power will be removed from the circuitry. If no stop instruction is supplied, the first instruction word in the program will be reread into register 53, and the operation as described will continue until the user manually intervenes by entering a stop command via key pad 12 or hand control 14.

When water is flowing through solenoid valve 86 or 88, the user controls the flow volume at the tub or shower by flow control 112 as discussed.

Discrete and analog scald protect devices 120 and 121 (FIG. 2b) provide redundant protection against scalding by the series operation of switches 116 and 118 to shut off solenoid valves 86 and 88.

If the hot water supply temperature measured by sensor circuit 37 (FIGS. 1 and 2b) drops by at least a selected rate, detector 128 will signal indicator 132 and thereby advise the user of a depleting water state.

If the user desires to see the time or mixer output temperature, display 42 (FIG. 1) may be alternately switched to display one of those quantities.

If the user desires to have the temperature audibly pronounced, voice synthesizer 44 and speaker 41 will convert the digital time and temperature information to audio as described.

Having thus described my invention, what is claimed is:

1. A bath water control system for controlling water flow to a personal bath unit including a bath drain and comprising:

mixing valve means having a hot water input, a cold water input, and a mixed water output and responsive to a control input for supplying a selected mixture of hot and cold water at said mixed water output;

actuator means responsive to both a selected temperature signal and a signal representative of the temperature of water from said mixed water output, for providing said control input to said mixing valve means;

at least one fluid passageway having an input connected to said mixed water output and having a passageway output; and control means for providing a said selected temperature signal to said actuator means and comprising:
memory means for storing at least one selected temperature signal,
readout means for selectively sensing one of said selected temperature signals and providing it as a selected temperature signal to said actuator means,
temperature adjustments means coupled between said program selection means and said actuator means for selectively varying said selected temperature signal,
second D memory means for storing at least one selected time duration signal representative of a discrete time period, and
said program selection means further includes means in circuit with said actuator means and said second memory means for selectively sensing a said time duration signal together with a said selected temperature signal and providing said selected temperature signal to said actuator means for a said discrete time period.

2. A system as set forth in claim 1 wherein said program selection means further includes means for selectively sensing a plurality of said time duration signals together with a plurality of said temperature representative signals for providing as a sequence selected time-temperature signal pairs.

3. A system as set forth in claim 1 including first and second said passageways connected to said mixed water output and providing discrete tub and shower mixed water supplies, and said system further comprises:
- a first electrically controlled valve in said first fluid passageway and having an "on" control input for providing fluid flow and an "off" control input for interrupting fluid flow;
- a second electrically controlled valve in said second fluid passageway and responsive to an "on" control input for providing fluid flow and responsive to an "off" control input for interrupting fluid flow; and
- said control means further includes means for selectively providing said "on" and "off" control inputs to said first and second electrically controlled valves.

4. A system as set forth in claim 3 comprising shutoff means responsive to a temperature of water output from said mixing valve means in excess of a selected temperature for providing a said "off" control input to at least one of said electrically controlled valves.

5. A system as set forth in claim 4 including drain closing means responsive to an "on" control input having been provided to one said electrically controlled valves and water temperature from said mixed water output being at least of a selected temperature for closing a drain associated with a said bath unit.

6. A system as set forth in claim 5 wherein said control means includes time start selection means for controlling the start time of operation of a said "on" input to said electrically controlled valves.

7. A system as set forth in claim 4 wherein said program selection means of said control means includes start time selection means for controlling the start time of a said discrete time period.

8. A system as set forth in claim 3 wherein said program selection means further includes means for selectively sensing a plurality of pairs of time a duration signal and temperature signal for providing as a sequence selected time-temperature signal pairs.

9. A system as set forth in claim 8 wherein said control means includes start time selection means for controlling the start time of operation of a said discrete time period.

10. A system as set forth in claim 9 including lockout means for inhibiting the operation of said control means.

11. A system as set forth in claim 10 further comprising detection means responsive to a decreasing temperature rate larger than a predetermined decreasing temperature rate of said hot water input for providing a warning signal.

12. A system as set forth in claim 11 comprising shutoff means responsive to a temperature of water output from said mixing valve means in excess of a selected temperature for providing a said "off" control input to at least one of said electrically controlled valves.

13. A system as set forth in claim 12 including drain closing means responsive to an "on" control input having been provided to one said electrically controlled valves and water temperature from said mixed water output being at least of a selected temperature for closing a drain associated with a said bath unit.

14. A system as set forth in claim 13 wherein said program selection means further includes means for selectively sensing a plurality of pairs of time a duration signal and temperature signal for providing as a sequence selected time-temperature signal pairs.

15. A system as set forth in claim 8 including lockout means for inhibiting the operation of said control means.

16. A system as set forth in claim 3 wherein said control means includes start time selection means for controlling the start time of operation of a said "on" input to one of said electrically controlled valves.

17. A system as set forth in claim 16 including lockout means for inhibiting the operation of said control means.

18. A system as set forth in claim 3 including lockout means for inhibiting the operation of said control means.

19. A system as set forth in claim 3 wherein said water output coupling means includes first, shower, and second, tub, mixed water output openings.

20. A system as set forth in claim 1 including lockout means for inhibiting the operation of said control means.

21. A system as set forth in claim 1 including voice synthesizer means responsive to the temperature of water from said mixed water output for providing a speech indication of said mixed water output temperature.

22. A system as set forth in claim 1 wherein said mixing valve means includes:
- an elongated housing;
- an elongated chamber within said housing;
- a set of first and second axially spaced openings, a hot water opening and a cold water opening, through a side of said housing to said chamber;
- a plunger axially slidable in said elongated chamber and having a cavity shaped to differentially couple to said first and second openings of said housing as said plunger is axially slid;
- water coupling means in said housing coupled between said cavity and the outside of said housing comprising at least one mixed water output opening;
- whereby with differing axial positions of said plunger, varying ratios of hot and cold water are applied to a said mixed water output opening as a said mixed water output; and
- electromechanical driving means coupled to said plunger and responsive to said control input for selectively positioning said plunger in said housing chamber of said housing.

* * * * *